(12) United States Patent
Del Frari (10) Patent No.: US 7,913,961 B2
(45) Date of Patent: Mar. 29, 2011

(54) HAND GRIP FOR PALM-HELD DEVICES

(76) Inventor: Paul James Del Frari, Meredith, NH (US)

( * ) Notice: Subject to any disclaimer, the term of this patent is extended or adjusted under 35 U.S.C. 154(b) by 458 days.

(21) Appl. No.: 12/080,095

(22) Filed: Mar. 31, 2008

(65) Prior Publication Data
US 2008/0237425 A1 Oct. 2, 2008

Related U.S. Application Data

(63) Continuation-in-part of application No. 11/255,422, filed on Oct. 22, 2005, now abandoned.

(51) Int. Cl.
*A47B 96/06* (2006.01)
(52) U.S. Cl. ............ 248/205.1; 248/309.1; 248/346.01; 379/449
(58) Field of Classification Search .................. 248/127, 248/146, 158, 176.1, 177.1, 205.1, 220.21, 248/220.22, 309.1, 346; 379/449, 446, 379/454, 455
See application file for complete search history.

(56) References Cited

U.S. PATENT DOCUMENTS

| | | | | |
|---|---|---|---|---|
| 3,861,697 A * | 1/1975 | Dolce | ........................... | 280/825 |
| 5,187,744 A * | 2/1993 | Richter | ........................ | 379/449 |
| 5,407,164 A * | 4/1995 | Quinn | ........................ | 248/316.7 |
| 5,457,745 A * | 10/1995 | Wang | ........................... | 379/454 |
| 6,302,037 B1 * | 10/2001 | Del Frari | ................. | 108/157.16 |
| 2002/0099894 A1 * | 7/2002 | Kehoe et al. | .................. | 710/300 |
| 2002/0159775 A1 * | 10/2002 | Muller | .......................... | 396/534 |
| 2003/0021084 A1 * | 1/2003 | Cho et al. | ...................... | 361/683 |
| 2003/0116631 A1 * | 6/2003 | Salvato et al. | ........... | 235/472.01 |
| 2004/0256432 A1 * | 12/2004 | Orenstein | ..................... | 224/660 |
| 2005/0072691 A1 * | 4/2005 | Schlansky | ..................... | 206/232 |
| 2005/0086410 A1 * | 4/2005 | Landron et al. | ............... | 710/303 |

* cited by examiner

*Primary Examiner* — Terrell Mckinnon
*Assistant Examiner* — Todd M. Epps (57) ABSTRACT

A hand grip with a rigid sheet base surfaced on top and bottom sides with slip-resistant, resiliently deformable material combining with contoured lateral edges for firmness of grasp. Housed in one lateral side is a spring tension device through which a pliable wire passes, adjustably loops above grip's top surface on which palm-held devices seat; wire then secures to opposed side of grip. A demountable bracket assembly connects a weight bearing rod to grip's rigid sheet. The rod has an end-cap connecting it to an open ended cylinder attachment. Lenses seat against a sill at one of the cylinder's ends; their central visual axis intersecting the grip's midline longitudinal axis. Demountable concentric ring laminations attach above cylinder's opposite opened end. These ring laminations hold additional items congruent with cylinder's alignment.

3 Claims, 7 Drawing Sheets

HAND GRIP FOR PALM-HELD DEVICES

CROSS-REFERENCE TO RELATED APPLICATIONS

Continuation-in-Part of U.S. application Ser. No. 11/255,422, filed Oct. 22, 2005, now abandoned.

STATEMENT REGARDING FEDERALLY SPONSORED RESEARCH

Not Applicable

BACKGROUND OF THE INVENTION

This invention is a CIP of application Ser. No. 11/255,422. It discloses means for improved hand control and display of visual data for palm-held devices such as cellular phones, compasses, GPS devices.

Prior art informs practitioners on three primary objectives in improving the means of holding and operating hand held devices: to improve the ergonomics of using small devices, to increase usage by lessening unintended manipulation of device controls and functions, to increase the functionality of digital devices.

US Patent Application 20020099894 to Kehoe et al. published Jul. 25, 2002 teaches improvements in the functionality and ergonomics of hand held personal digital assistant devices by improving their stability and access to hand grasp when the device is resting on flat surfaces.

These improvements being the modification of the forward edge of PDA to form a resting stand with additional lateral extension supports to said stand and a wrist strap for the user.

US Application 20030021084 to Cho et al. published on Jan. 30, 2003 teaches on the use of a stand structure to hold a digital device, in this case a wireless LAN adapter. The disclosed stand improves functionality by allowing for rotational movements of the adapter for improved signal transmission within a computer network.

US Application 20050086410 to Landron et al. published on Apr. 21, 2005 discloses an adapter unit that "adds functionality and ruggedness to a commercially designed device for use in an industrial environment" by designing a housing for the digital device, PDA, which can be detachably secured to said hand held computer. The device being useable inside of or removed from its housing.

US Application 20030116631 to Salvato et al. published on Jun. 26, 2003 discloses an adapter unit for a personal digital assistant having an ergonomic grip. Here the adapter unit structure forms a ridge and gripping angle combination to improve hand control by helping prevent a user's fingers from slipping off the gripping surface.

US Application 20040256432 to Orenstein published on Dec. 12, 2004 disclosed an electronic device holder that teaches use of ergonomics, increased utility and increased ruggedness of a broadly applicable closed loop design; this design embodied in a body worn holder as a means of capturing the electronic device in a manner that does not suffer the limitations of holders customized to fit individual products they serve.

US Application 20050072691 to Schlansky published on Apr. 7, 2005 echoes several common prior art issues in advancing the objectives of functionality, ruggedness, and ergonomics: that a holder of electronic devices should maintain a position of easy accessibility, usability of the device when captured by the holder and when being used independent of it, useable with a range of sizes and designs of electronic products, and the need to be usable in the many locations and situations that communications devices are used in. Schlansky discloses a pair of opposed arms capable of adjustable pressure against an object. The arms forming a partial loop around a central support area a device to be held is set upon.

US Application 20020159775 to Muller published on Oct. 31, 2002 makes a disclosure on a vital usage issue for all hand held electronic devices, the effects of ambient lighting conditions on the visual display of an LCD screen. Muller's disclosure is of a focusing hood for digital cameras to shield a digital camera LCD screen from glare effects.

U.S. Pat. No. 5,457,745 to Wang discloses a rigid assembly holder for mobile phones which is adjustable in depth, width, and length to hold a range of phones; it is accommodative to the variety of environments mobile phones are used in and to variation in phone sizing.

U.S. Pat. No. 5,407,164 to Quinn discloses a means of holding and supporting objects of variable size and shape such as an electric lamp or flower pot on level surfaces; a window sill application is illustrated. Disclosed is the use of a resilient cord attaching to a rigid base assembly with the resilient cord expanding to loop around objects of varying dimensions. The resilient cord connects to tabs of an upper supporting section of the base assembly applying a holding pressure on the object against the base. The base is accommodative to varying sill configurations.

U.S. Pat. No. 5,187,744 to Richter discloses a hand-held portable telephone holder for releasably holding a hand-held portable car phone wherein two independent laterally adjustable fingers on one side of a "rigid planar body", a first set of fingers, are opposed by two pivoting spring tension fingers on the other side, a second set of fingers. The phone is held between opposed first and second fingers; it is held against the rigid planar body by the spring tension of the pivoting fingers; variance in phone size is accommodated by the lateral adjustability of the first fingers.

U.S. Pat. No. 3,861,697 to Dolce discloses an attachment for holding a roller skate's wheels immobile against a rigid form for pedestrian travel. "In general, the attachment comprises a base member formed to provide wheel-cups to constrain forward and rearward roll of skate wheels therein engaged, and abutting means to constrain lateral motion of said wheels. Removably securing means are provided to hold the base member in close and firm relation to the wheels, hence to the skate and to the shoe onto which the skate is mounted."

Prior art illustrates diverse means for holding hand-held and other objects to a rigid support for improved stability of grip, improved stability on surfaces, improved manipulation and usage, and improved safety.

No found art teaches the combining of a demountable bracket assembly to the rigid component of a holding device; the bracket assembly being means of complementing the secured device's functions by addition of performance enhancing rods: rods that align items in the space above the secured object such as lenses above a device's screen—lenses that may be prescription, glare screens and filters, tools that are used with the secured device, etc.

No found art employed the combination of slip-resistant, resiliently deformable materials adhered to a rigid platform with means of applying downward pressure onto this material; thereby, the contours of a palm-held device's form are pressed down into the resilient material preventing the device from movement in any direction. Slip-resistant, resiliently deformable material attached to the hand grip's bottom surface holds the hand grip stable on any flat surface.

U.S. Pat. No. 6,302,037 to Del Frari discloses demountable pliable, weight bearing rods connecting to rigid forms. This art is relevant to this CIP application and is advanced by it.

Claims to U.S. Pat. No. 6,302,037 identify a set of components that construct and configure weight bearing rods of variable pliability that attach to and release from rigid forms; the set: an independent demountable frame assembly with a plurality of sockets, a plurality of embedded seats and apertures for fasteners, a plurality of sills; slideable and pivoting couplings; brackets; cul-de-sac and other forms of cut-outs; fixed angle bends; rods of variable pliability—rods that may be steel; rods assembled of concentric laminations with a means of manufacturing rods of different pliability, rods with variable exterior surface qualities.

SUMMARY OF THE INVENTION

This hand grip assists firmness of grasp for palm-held devices like field compasses and cell phones. It provides a rigid base to which a device is tethered and released from and holds a tethered device in place when it is positioned on any flat surface. The grip may be used with or without the attachment.

This grip is a generally rectangular sheet of rigid material of variable thickness with contoured and scored lateral edges. Its opposed sides are laminated with slip-resistant, resiliently deformable material. Its top side having a longitudinal lamination of hook and loop material. There are a plurality of recessed modular recesses at one end edge. The sheet has a centered cylindrical cut-out in the longitudinal dimension of one of its lateral contoured edges. This cylindrical cut-out ends in a top side opening of the lateral edge. This top side opening is correspondingly positioned to a top side opening at the opposed lateral and solid edge. The opposed opening is to a vertical cut-out ending in a surface depression on the bottom side of the solid lateral edge. A pliable line, secured by knot in the space provided by the surface depression, passes through the solid lateral edge to its top side opening and loops above the sheet's top surface to reinsert into the top side opening of the cylindrical cut-out, thereby entering the centered longitudinal cut-out. Embedded in the cylindrical cut-out lateral edge is a housing for a spring tension cord stop through which the line passes in traveling the length of this cut-out. Exiting the sheet at the end edge opposed to sheet's modular recessed end, the extending line's end is prevented from returning into the cylindrical cut-out by a non-tensioned cord stop. The spring tension mechanism allows the size of the loop between the sheet's top side and the line to be variably set, pulling the line against a device in contact with the top side laminations applies a holding pressure on the device with the resiliently deformable surfacing accommodating the held device's contours.

A plurality of studs extend from a front edge of the horizontal component of a bracket. These studs mate correspondingly by insertion into the rigid sheet's modular recessed end. Inserting the studs into the sheet aligns the bracket's horizontal component with the rigid sheet's laminated sides. Perpendicular to the bracket's horizontal component, its vertical component extends to a greater elevation than the rigid sheet's laminations. The vertical component has front and rear edges. The front edge is contoured with a cul-de-sac cut-out centered along its contour. The rear edge is straight. The cul-de-sac's opening is proximal to the vertical component's top; its circular end being proximal to the intersection of the bracket's vertical and horizontal components. Sections of the bracket have been hollowed leaving parallel walls between the front rear edges of its vertical component. The cul-de-sac cut-out being a surface feature of the contoured front edge; a bottom side of the cut-de-sac cut-out is defined by the separation space between the vertical component's parallel walls. The separation between parallel walls being of a greater width than the cut-de sac's opposed lateral sides. Opposed circular cut-outs in the parallel walls flank the opened end of the cul-de-sac. These cut-outs seat a top pin which transverses the span between the bracket's walls.

A coupling of generally I-beam design having an upper and a lower component joined by a vertical component. Upper and lower components respectively extend transversely above and below the cul-de-sac's opposed lateral sides. The upper component having a contour corresponding to the vertical component's contour edge. The lower component being circular. The coupling's vertical component situates between the cul-de-sac's lateral sides so that the coupling may slide between the cul-de-sac's opening and its end.

The coupling engages both top and bottom sides of the cul-de-sac and travels the cul-de-sac as a track. The seated top pin serves as a brake to stop the coupling's moving beyond the cul-de-sac track.

A hook is embedded in the portion of the coupling extending between the vertical component's parallel walls.

Rods constructed of elements disclosed in claims of U.S. Pat. No. 6,302,037 to Del Frari attach to top and bottom ends of this slideable coupling.

The bracket has a plurality of cut-outs. Aligned cut-outs at rear bottom of the vertical component function like a socket to seat a bottom pin which is parallel to the vertical component's top pin. Prior art claims rods of variable pliability; rods that may be steel. A steel extension spring is the rod segment occupying the span between the vertical component's parallel walls. The bottom pin is passed though a loop end of the steel rod securing one of the rod's ends to the bracket. The steel rod's opposed looped end connects to the coupling in the cul-de-sac track by capturing the coupling's embedded hook. Attached at opposed ends, this steel rod segment puts tension on the coupling in the track formed by the cul-de-sac's lateral sides.

The circular end of the cul-de-sac is reduced below its track's height to let the coupling be pulled nearer to the bracket's bottom pin. Extending the steel spring rod segment to reposition the coupling into the cul-de-sac track puts greater tension on the coupling.

The coupling's segment extending above the bracket's vertical component connects to contiguous rigid rod segments that continue the rod's configuration. The reduced tension on the coupling seats the coupling in the cul-de-sac's end; this serves as a stop on the rod's movement—a transport or carrying position for hand grip and device. The circular form of the slideable coupling's lower element eases the coupling's reengagement of the cul-de-sac track.

Rigid rod segments and bracket assembly are contoured and scored for improved pincher grasp to move the rod in its track and detach the bracket assembly from the rigid sheet.

An end-cap of generally cubic design with contoured edges ends the rod. A transverse circular cut-out of uniform diameter passes through the end-cap's center point. The span between the transverse cut-out and the end-cap's attachment to the rigid rod segments defines a lower section of the end-cap. The span between the transverse cut-out and the top contoured edge defines an upper section of the end-cap. A sill is formed in the lower section by reduction of the upper section in the dimension of its transverse circular cut-out; the sill is adjacent to the transverse cut-out. The transverse cut-out is a socket for attachments to the end-cap.

A cylinder opened on both opposed ends has a circular stud extension of uniform diameter from a point on its outside wall. This stud mates correspondingly by insertion into the end-cap's transverse circular cut-out. Insertion positions the cylinder laterally opposite the end-cap with its circular stud in contact with the sill. Surface tension between the circular cut-out, the cylinder's stud, and the sill requires limited force to rotate said cylinder.

An arc lamination applied to the cylinder's circular stud limits the cylinder's rotation.

An interior sill defines a bottom end of the cylinder. The sill is a support for items such as lenses placed into the cylinder. Lenses are held in place on the sill by concentric laminations to the cylinder's interior wall. Multiple lenses may be held by repeating the lamination process on both sides of a lens and parallel to the cylinder's sill.

An oblong post is perpendicular and adjacent to the cylinder's circular stud and forms a section of the cylinder's outer wall. The oblong post extends above the cylinder's open end in the direction opposite the interior sill and defines a top side opening of the cylinder. The oblong post has a plurality of aligned cut-outs in the area above the cylinder's top end opening.

Demountable, concentric ring laminations have an outside diameter congruent with the cylinder's wall and an inside opening diameter congruent with that formed by the cylinder's interior sill. Ring laminations may vary in thickness. Each ring lamination having a congruent rectangular arm extending from its circumference. Each extension arm having a congruent rectangular cut-out. Each congruent extension arm seating on the oblong post allowing the extension arm to move parallel to the post's longitudinal dimension. The laminations are held onto the post by insertion of an L-shaped lever pin which inserts into the post's vertically oriented cut-outs. The lever pin may be removed to add or delete rings from the cylinder. The lever pin contributes to surface tension between adjacent ring laminations and when the laminations are in contact with the cylinder's top opening.

Holes in the ring laminations' perimeters allow for attachments to be applied to the laminations. Attachments may include light shields. The ring laminations are support platforms for lenses, filters, polarizers, etc. to be added or deleted from the cylinder.

The contiguous rigid rod segments extending from the top side of the slideable coupling feature fixed angle bends of prior art; these bends position cylinder and ring laminations so that a line drawn through the cylinder's center intersects the rigid sheet's center longitude line.

The ring laminations have a plurality of curved brackets on their perimeter which allow for easy finger grasp and control of their sliding along the cylinder's post. They may be slid into position so that their central axis fully aligns with the cylinder's; or they may be slid so that only a portion of ring's opening is within the opened area of the cylinder.

REFERENCE NUMERALS TO DRAWINGS

1 rigid sheet
2 contoured and scored lateral edges of rigid sheet
3 slip-resistant, resiliently deformable material
4 top surface longitudinal lamination of hook and loop material
5 modular recesses
6 centered cylindrical cut-out for pliable line in longitudinal dimension of lateral edge
7 end edge opening of cylindrical cut-out
8 top side lateral edge opening of cylindrical cut-out
9 top side opening of vertical cut-through in solid lateral edge 10 surface depression ending of vertical cut-through of solid lateral edge
11 pliable line in all figures and knotted end of pliable line at surface depression
12 rigid sheet's housing for spring tension cord stop
13 non-tensioned cord stop
14 spring tension cord stop with line passing through it
15 demountable bracket assembly
15a front edge studs extending from bracket's horizontal component
15b bracket's vertical component
16 contoured front edge of bracket's vertical component
17 cul-de-sac cut-out
17a parallel walls of greater width than lateral sides of cul-de-sac cut-out, walls separate front and rear edges of bracket's vertical component
18 circular cut-outs in vertical component's parallel walls, cut-outs flank opening of cul-de-sac at top of bracket's vertical component
19 top pin+bottom pin
20 I-beam like coupling—embedded hook, upper and lower components
21 aligned cut-outs at bottom side of bracket's vertical component
22 pliable steel rod, a steel extension spring with looped ends
23 coupling's embedded hook
24 height reduction in circular end of cul-de-sac cut-out, I-beam coupling seating in cul-de-sac end for transport and when rod is not needed
25 rod end-cap
25a end-cap upper section
25b end-cap lower section
26 transverse circular cut-out
27 end-cap's sill
28 cylinder attachment's stud
29 arc lamination to stud
30 interior wall sill
31 lenses
31a polarizing light filter
32 lamination to interior cylinder wall, above and parallel to cylinder sill
33 oblong post
34 oblong post's aligned cut-outs
35 rectangular extension arm
35a extension arm's rectangular cut-out
36 demountable ring lamination
37 L-shaped lever pin
38 curved bracket extension to circumference of ring laminations
39 fixed angle bends
40 attachment holes in perimeter of ring laminations

DETAILED DESCRIPTION OF DEVICE

Figure 1:
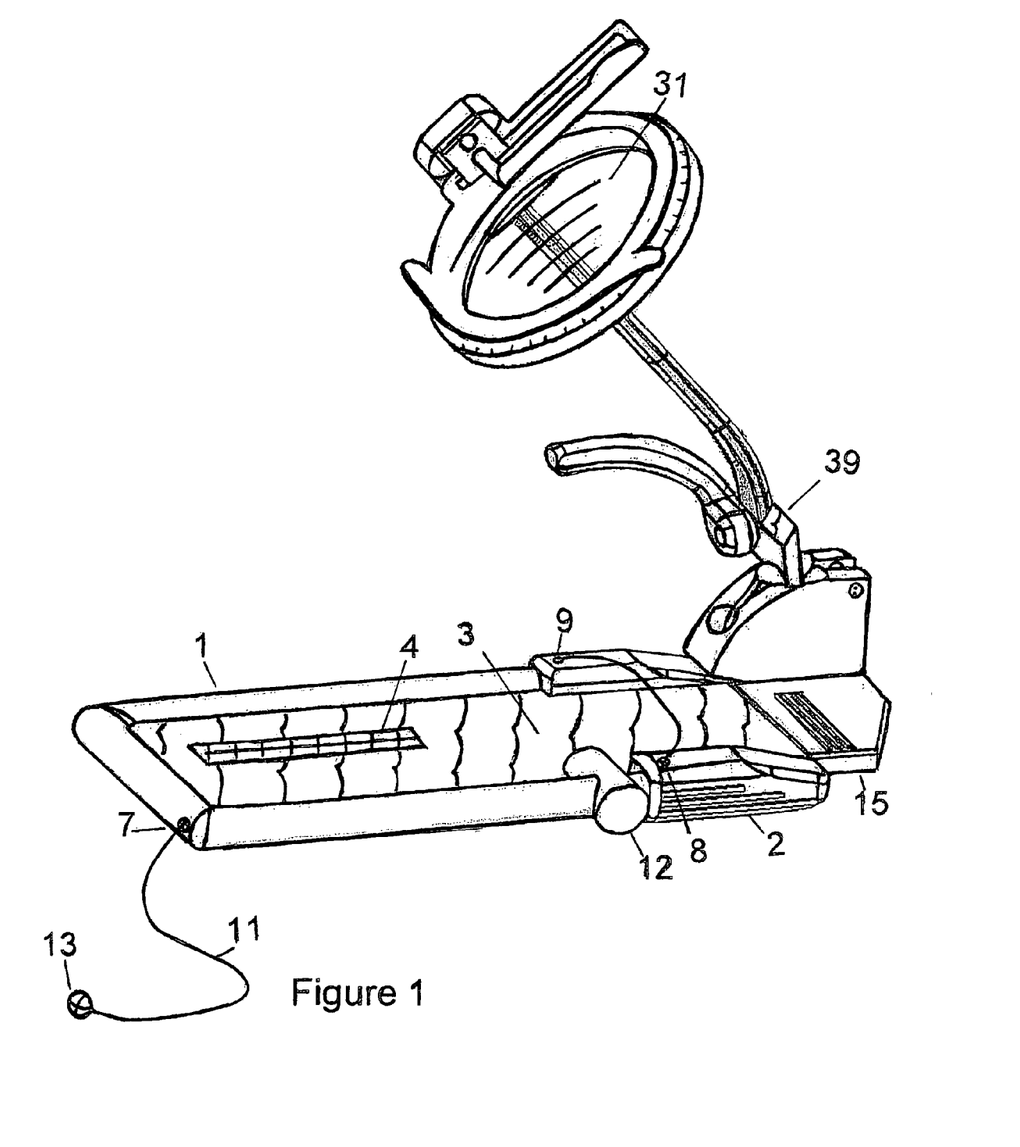
FIG. 1: side view of hand grip with bracket assembly attached and rod at top of bracket's vertical component, the opened or general use position Included in view is the integration of a rod component of prior art (a fixed angle bend, (39), which is covered with resiliently deformable material); when the rod is opened—at maximum height above the rigid sheet—this angle is thirty degrees to the rigid sheet and functions as stop for the spring action of a cell phone's lid; it is a perch for the stopped lid, holding the phone's viewing screen at thirty degrees to the rigid sheet
Figure 2:
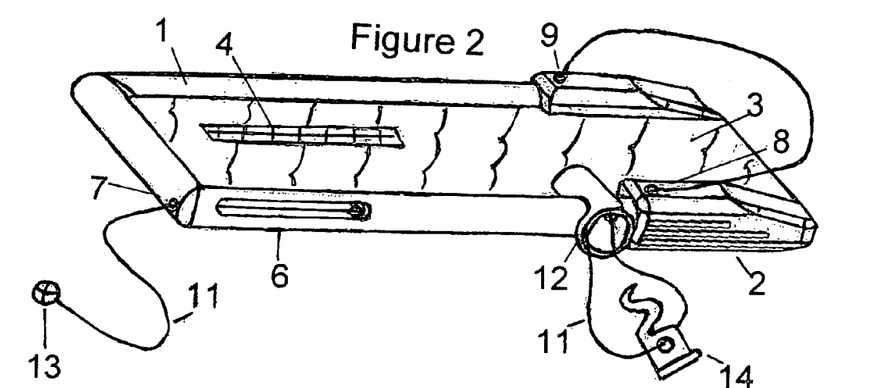
FIG. 2: oblique side view of laminated rigid sheet with pliable line inserted into cylindrical cut-out and passing through spring tension cord stop
Figure 2A:
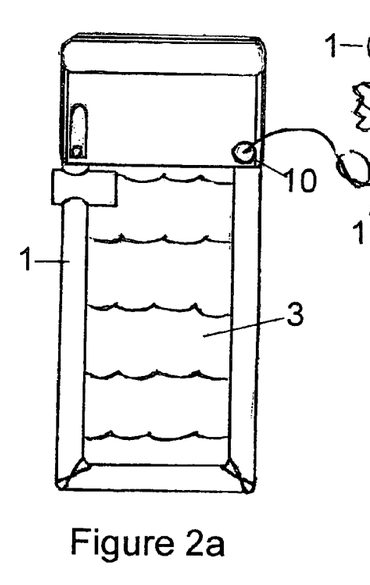
FIG. 2*a*: bottom view of rigid sheet showing knotting of line and surface depression
Figure 2B:
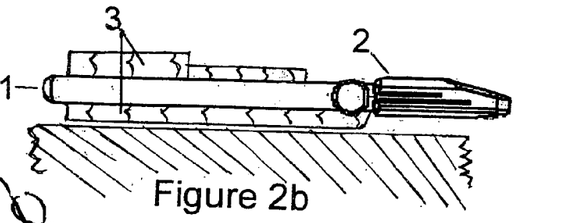
FIG. 2*b*: side view of rigid sheet showing that its bottom side lamination of resiliently deformable material is the contact surface sheet is engaged by when grip is not being held, top side laminations may vary in thickness to accommodate classes of devices
Figure 2C:
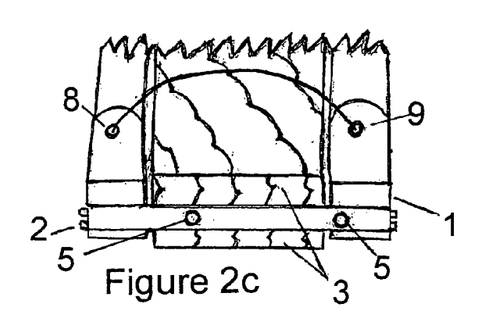
FIG. 2*c*: end edge view of rigid sheet showing modular recesses

FIG. 2 is an oblique side view of the hand grip. (1) in FIGS. 1, 2, 2a, 2b, and 2c is a sheet of rigid material. This sheet is of variable thickness with contoured and scored lateral edges, (2) in FIGS. 1, 2. 2b, 2c. Its opposed sides are laminated with slip resistant, resiliently deformable material, (3) in FIGS. 1, 2, 2b, 2c. The top side has a longitudinal lamination of hook and loop material, (4) in FIGS. 1 and 2. FIG. 2c, an end edge view of the rigid sheet, illustrates a plurality of modular recesses, (5), on this end edge. The sheet has a centered cylindrical cut-out in the longitudinal dimension of one of its contoured lateral edges, (6) in FIG. 2. This cylindrical cut-out ends in a top surface opening of this cut-out lateral edge, (8) in FIGS. 1, 2, and 2c; this opening is correspondingly positioned to a vertical cut-out opening at the opposed, solid, lateral edge, (9) in FIGS. 1, 2, and 2c. This vertical cut-out opening ends in a surface depression on the bottom side of the solid lateral edge, (10) in FIG. 2a. (11) in FIG. 2a is a knotted pliable line that embeds in the surface depression. The line, (11) in FIGS. 1, 2, and 2a; passes through the solid lateral edge to its top side opening, loops above the sheet's top surface to reinsert into the cylindrical cut-out at (8) in FIGS. 2 and 2c. Embedded in the cut-out lateral edge is a housing for a spring tension cord stop through which the pliable line passes in traveling the cylindrical cut-out, (12) in FIGS. 1 and 2. Exiting the sheet at the cylindrical cut-out's end edge opening, (7) in FIG. 2, the extending line segment is prevented from being pulled into the cylindrical cut-out by a non-tensioned cord stop, (13) in FIGS. 1 and 2. The spring tension mechanism, (14) in FIG. 2, allows the space between the sheet's top surface and the line to be variably set, pulling the line against a device which is in contact with the rigid sheet's top surface laminations applies a releaseable holding pressure against the device.

Figures 3, 3A:
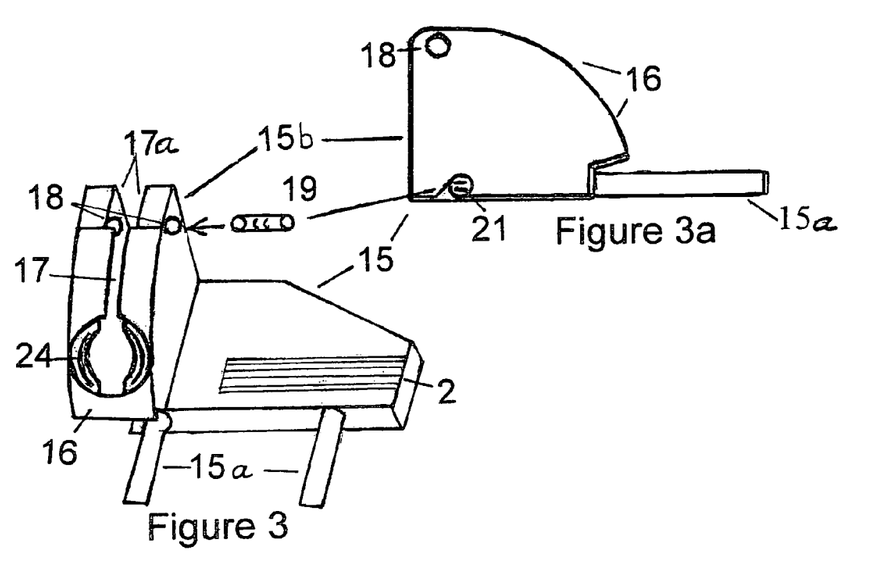
FIG. 3: front view of bracket assembly
FIG. 3*a*: side view of bracket assembly

A plurality of studs, (15a) in FIGS. 3 and 3a, extend from a front edge of the horizontal component of a demountable bracket, (15) in FIGS. 3 and 3a. These studs mate correspondingly by insertion into the rigid sheet's modular recessed end. Stud insertion aligns the bracket's horizontal component with the rigid sheet's laminated sides, FIGS. 1, 4c, 7, 7a. The bracket's vertical component, (15b) in FIGS. 3 and 3a, is perpendicular to the horizontal component, FIGS. 1, 4c, 7. The bracket's vertical component has front and rear edges. The front edge of the vertical component is contoured, (16) in FIGS. 3 and 3a. Its rear edge is straight. Sections of the bracket have been hollowed leaving parallel walls between the vertical component's front and rear edges. The front edge is further distinguished by a centered cul-de-sac cut-out, (17) in FIG. 3, the opening of which is proximal to the vertical component's top; its circular close is proximal to the intersection of the bracket's vertical and horizontal components. The cul-de-sac cut-out being a surface feature with a bottom side of the cut-de-sac defined by the separation space between the vertical component's parallel walls. The separation between the parallel walls being of a greater width than the cut-de sac's opposed lateral sides, (17a) in FIG. 3. Opposed circular cut-outs in the parallel walls flank the entrance to the cul-de-sac opening at the vertical component's top, (18) in FIG. 3. These cut-outs seat a top pin which transverses the span between the vertical component's parallel walls, (19) in FIGS. 3 and 3a.

Figures 4, 4A, 4B:
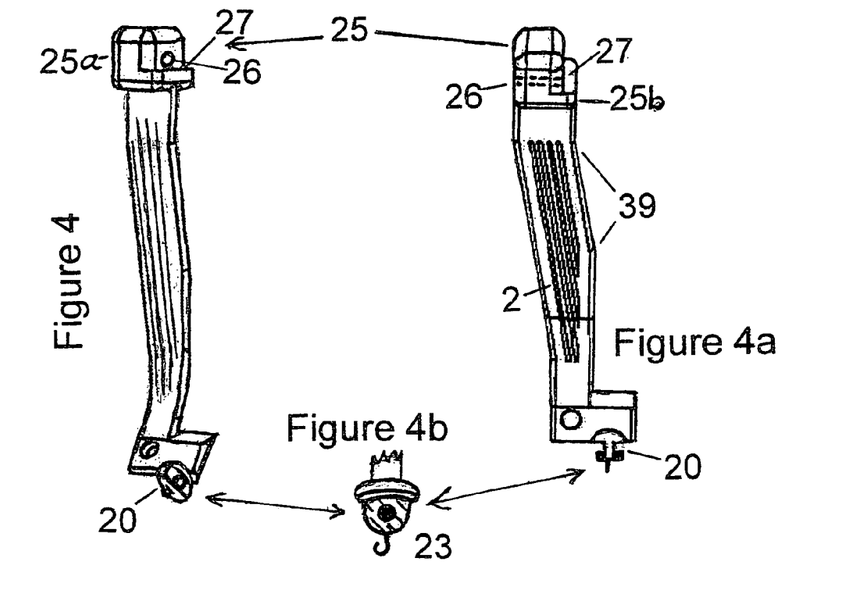
FIG. 4: side view of rod: slideable coupling at bottom end and end-cap at top
FIG. 4*a*: front view of rod showing slideable coupling and end-cap
FIG. 4*b*: detail of hook embedded in slideable coupling relative to upper contoured and lower circular components of the coupling

(20) in FIG. 4a, shows a coupling of generally I-beam design having an upper and a lower component each of which respectively extend transversely above and below the opposed lateral sides of said cul-de-sac. FIG. 4b shows the upper component having a contour corresponding to the bracket's vertical component's contour. The lower component being circular. The coupling's vertical component (20) in FIG. 8, situates between the cul-de-sac's lateral sides so that the coupling may slide between the cul-de-sac's opening and its end.

A hook is embedded in the portion of coupling extending below the cul-de-sac's bottom side into the space between the parallel walls, (23) in FIGS. 4a and 4b. The coupling engages both top and bottom sides of the cul-de-sac and travels it as a track, (20) in FIG. 4c. The seated top pin serves as a brake to stop the coupling's moving beyond the track, (19) in 4c. Rod segments of prior art attach to this slideable coupling at both its top and bottom ends.

The bracket has a plurality of cut-outs. A pair of aligned cut-outs, (21) in FIG. 3a, on the bottom side of the bracket's vertical component function like a socket to seat a bottom pin, (19) in FIG. 3a, which is parallel to the vertical component's top pin, (19) in FIGS. 3 and 3a. Prior art cites rods of variable pliability; rods that may be steel. A steel extension spring is the steel rod segment occupying the span between the vertical component's parallel wall, (22) in FIG. 4c. The bottom pin is passed though a loop end of the steel rod securing one of the rod's ends to the bracket assembly. The steel rod's opposed looped end connects to the coupling in the cul-de-sac track by capturing the coupling's embedded hook in its other looped end, (23) FIG. 4c.

Figures 4C, 5:
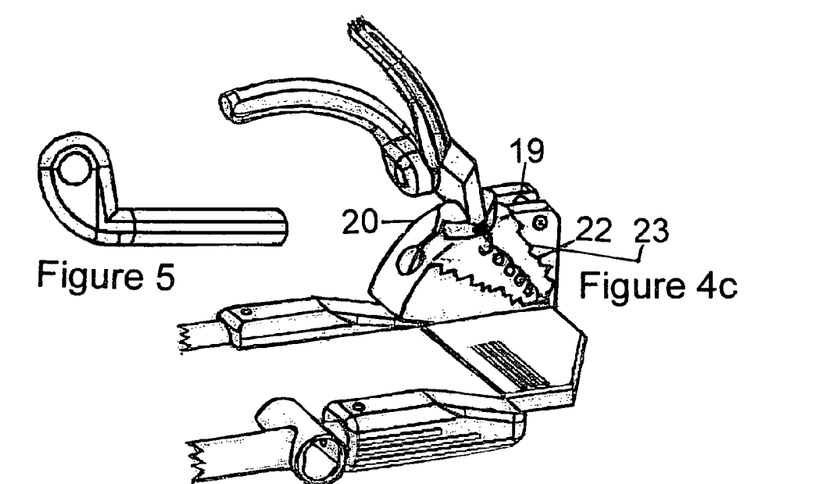
FIG. 4*c*: oblique view of attached bracket assembly with illustration of a prior art application: pliable rod that may be steel, a steel extension spring connected at one of its looped ends to the bracket's bottom pin and to hook of coupling at its other end
FIG. 5: pivoting arm attachment to one of the contiguous rigid rod segments above the bracket assembly This is a prior art application: a circular cut-out in one of the rod's contiguous rigid segments positions a pivoting coupling for this arm which rotates into the space above the rigid sheet. When rod is at maximum height, this arm can stop the spring driven motion of a cell phone lid at the point when the lid is perpendicular to the sheet yielding an unobstructed sight line for a phone's camera lens to take pictures without having to detach phone from grip.

Attached at opposed ends, this steel rod segment puts tension on the coupling in the track formed by the cul-de-sac's lateral sides, FIG. 4c. The circular end of the cul-de-sac is of a larger diameter than the coupling's upper component. The circular end is reduced in elevation below the bracket's contoured front edge, (24) in FIG. 3, to let the coupling be pulled nearer to the bottom pin, seating the rod into a semi-locked or transport position. In order to move the rod onto the cul-de-sac track it must be pulled from its seat by extending the steel rod segment to reposition the coupling to slide between the cul-de-sac's lateral edges, the track. FIG. 4b shows the circular shape of the lower parallel element of the I-beam like coupling; the circular shape assisting the coupling's re-engagement of the cul-de-sac track.

Above the cul-de-sac surface the coupling connects to contiguous rigid segments in a sequence of fixed angle bends that continue the rod's configuration, (39) FIG. 4a. Rigid rod segments and bracket frame assembly are contoured and scored for improved pincher grasp to move the rod in its track and attach bracket assembly to sheet, (2) in FIGS. 3 and 4a.

An end-cap of generally cubic design with contoured edges ends the rod, (25) in FIGS. 4 and 4a. A transverse circular cut-out of uniform diameter passes through the end-cap's center point, (26) in FIGS. 4 and 4a. The span between the transverse cut-out and the end-cap's attachment to the rigid rod segments defines a lower section of the end-cap, (25b) in FIG. 4a. The span between the transverse cut-out and the contoured top edge being an upper section of the end-cap, (25a) in FIG. 4 A sill is formed in the bottom section by reduction of the upper section in the dimension of its transverse circular cut-out; the sill is adjacent to the transverse cut-out, (27) in FIGS. 4, 4a, and 8. The transverse cut-out, (26), is a socket for attachments to the end-cap. In this application the attachment is an open ended cylinder.

Figure 6:
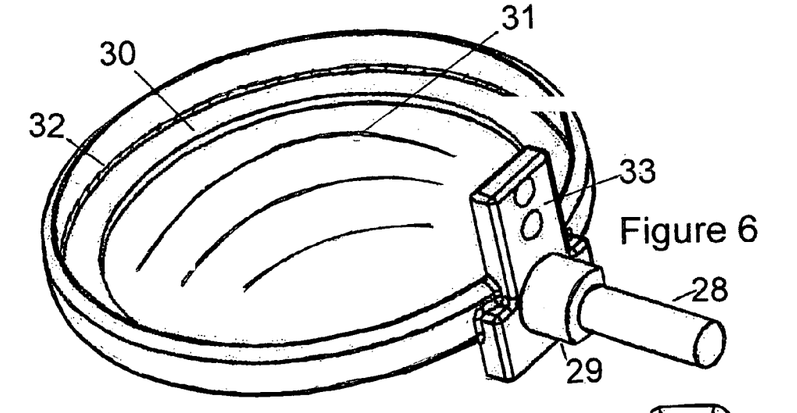
FIG. 6: cylinder attachment which connects by insertion into rod's end-cap
Figure 6A:
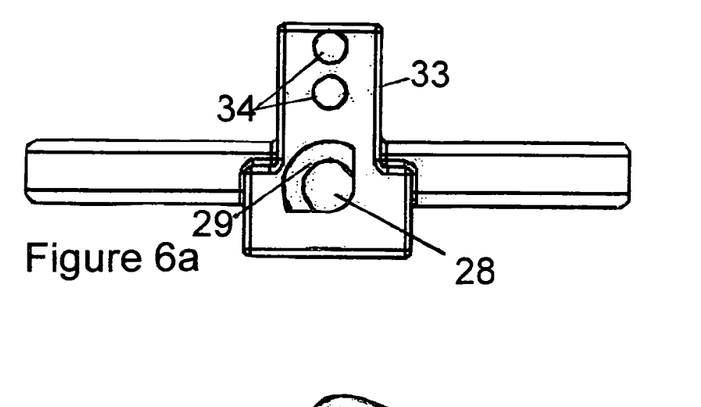
FIG. 6*a*: side view of cylinder attachment showing oblong post with aligned cut-outs for L-shaped lever pin, and arc lamination to cylinders circular stud
Figure 7:
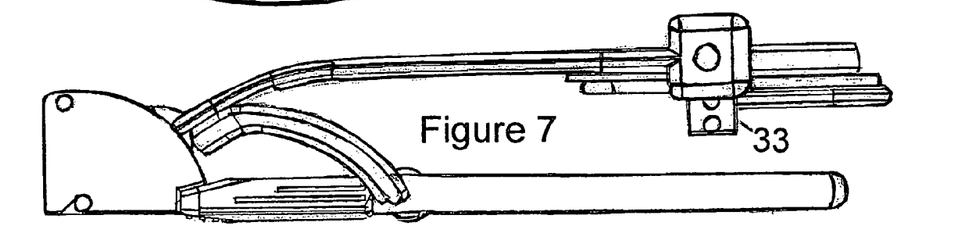
FIG. 7: side view of hand grip with rod inserted into cul-de-sac's end, the carrying position for device
Figure 7A:
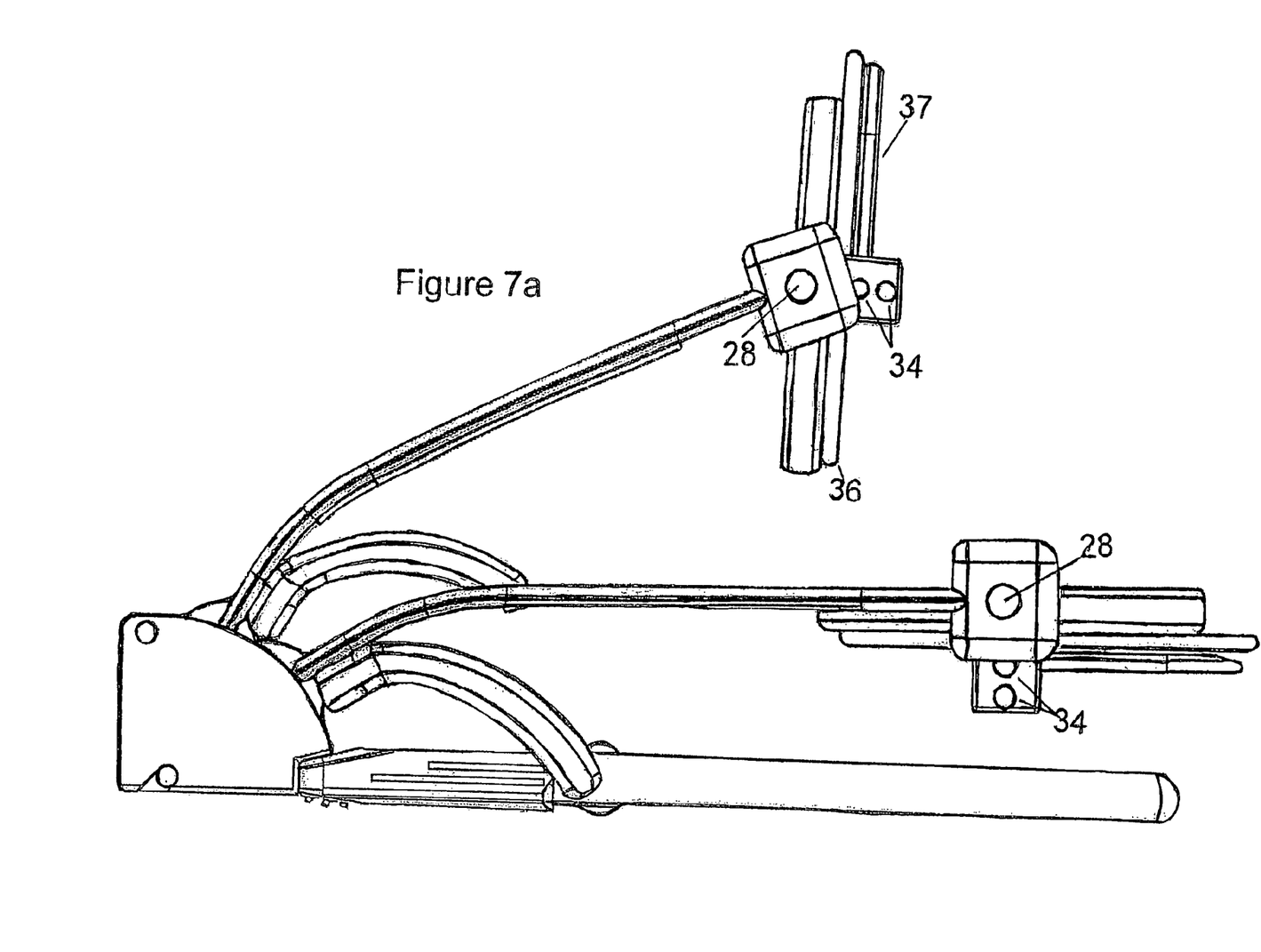
FIG. 7*a*: side view of hand grip showing movement of rod in cul-de-sac track from transport position towards opened position and pivoting of cylinder attachment

A cylinder opened on both opposed ends has a circular stud extension of uniform diameter from a point on its outside wall, (28) in FIGS. 6, 6a, and 7a. This circular stud mates correspondingly by insertion into the end-cap's transverse circular cut-out. Insertion positions the cylinder laterally opposite the end-cap, FIG. 8.

An arc lamination, (29) in FIGS. 6 and 6a, limits the cylinder's rotation.

An interior wall sill defines a bottom end of the cylinder, (30) in FIG. 6. The sill is a support for items such as lenses placed into the cylinder. Lenses are held in place on the sill by concentric laminations to the cylinder's interior wall, (31 and 32) in FIG. 6. Multiple lenses may be held by repeating the lamination process on both sides of a lens and parallel to the cylinder's sill.

An oblong post, (33) in FIGS. 6, 6a, and 7 is perpendicular and adjacent to the circular stud and forms a section of the cylinder's outer wall. The oblong post extends above the cylinder's open end in the direction opposite the interior sill and defines a top side opening of the cylinder. The oblong post has a plurality of aligned cut-outs in the area above the cylinder's top end opening, (34) in FIGS. 6a and 7a.

Figures 6B, 6C, 6D:
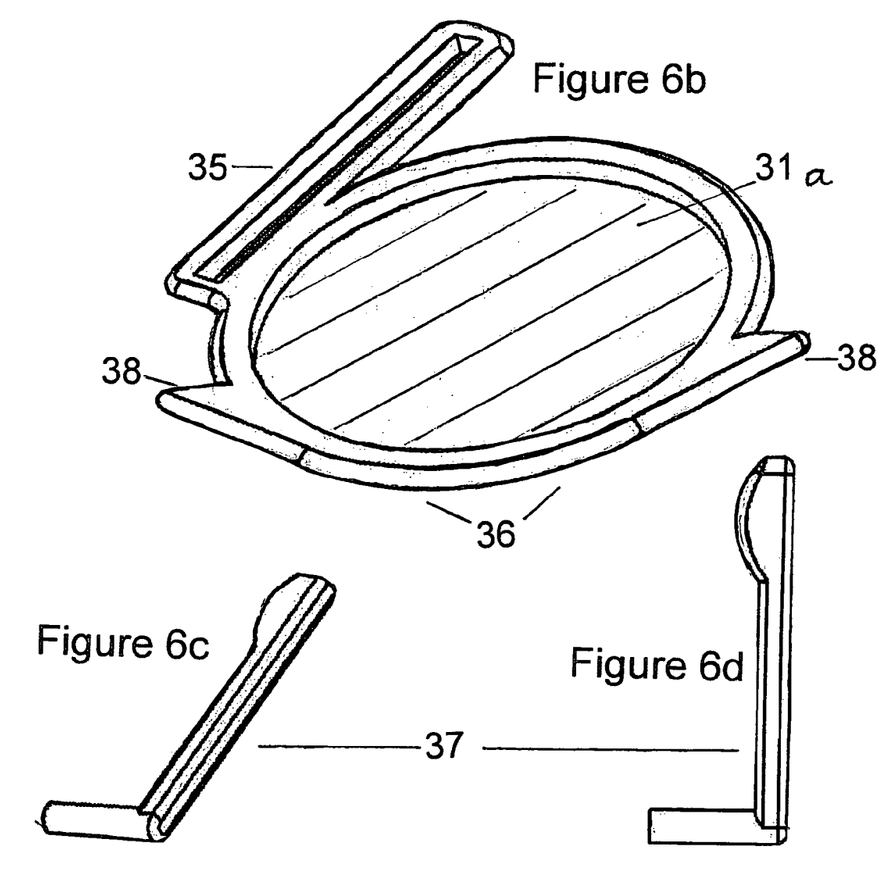
FIG. 6*b*: demountable ring lamination
FIG. 6*c*: L-shaped lever pin
FIG. 6*d*: L-shaped lever pin
Figure 8:
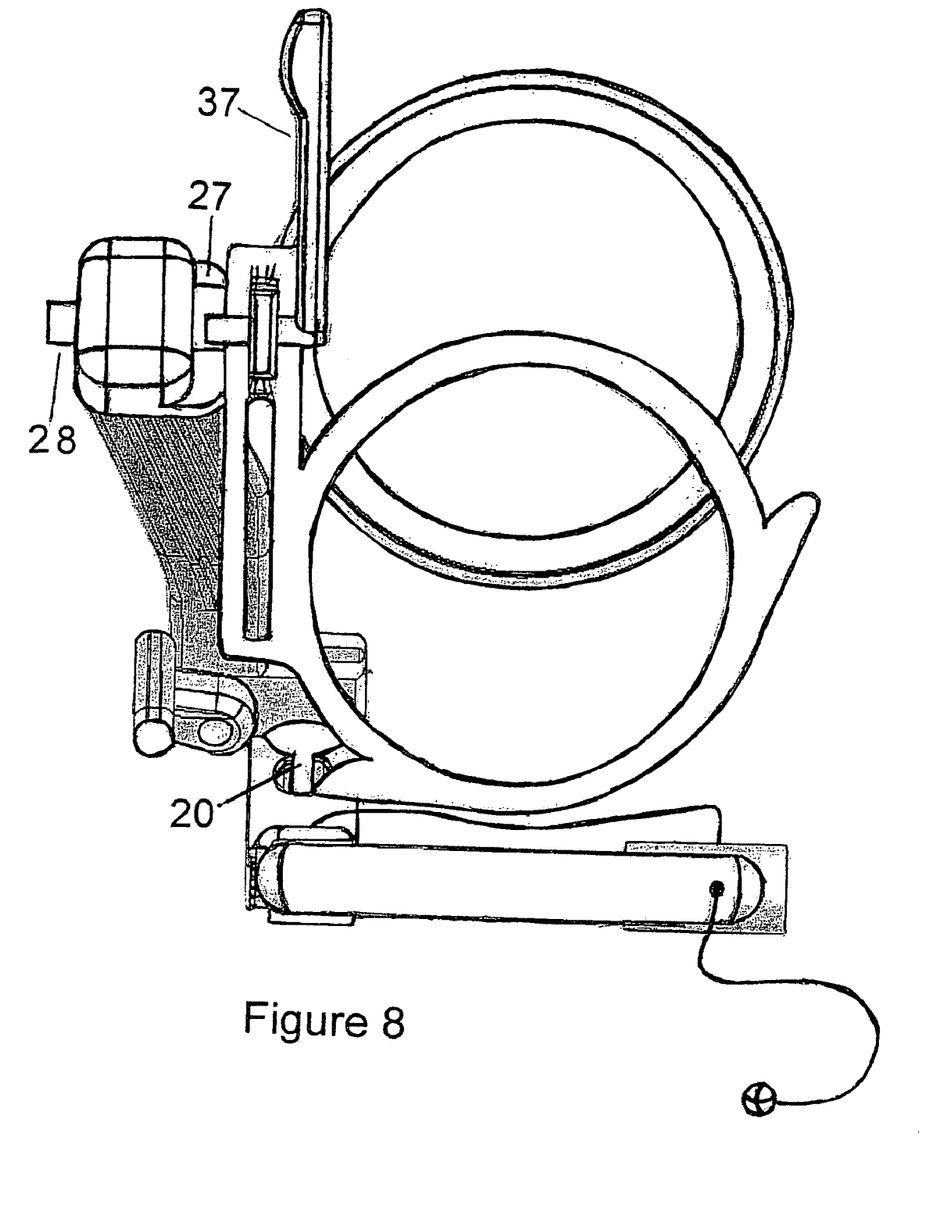
FIG. 8: end view of grip; rod is in carrying position, illustration showing sliding motion of ring lamination, fixed angle bend rod segments positioning alignment of congruent components

Demountable, concentric ring laminations, (36) in FIG. 6b, have an outside diameter congruent with the cylinder's wall and an inside opening diameter congruent with that formed by the cylinder's interior sill, FIGS. 7a and 8. Ring laminations may vary in thickness. Each ring lamination having a congruent rectangular arm extending from its circumference, (35) in FIG. 6b. Each extension arm having a congruent rectangular cut-out, (35a) in FIG. 6b. Each congruent extension arm seating on the oblong post. FIG. 8, allowing the extension arm to move parallel to the post's longitudinal dimension. The laminations are held onto the post by insertion of an L-shaped lever pin which inserts into the post's vertically oriented cut-outs, (37) in FIGS. 6c, 6d, 7a, and 8. The lever pin may be removed to add or delete rings from the cylinder. The lever pin contributes to surface tension between adjacent ring laminations and when the laminations are in contact with the cylinder's top opening.

The ring laminations have a plurality of curved brackets on their perimeter, (38) in FIG. 6b, which allow for easy finger grasp and control of their sliding along the cylinder's post. They may be slid into position so that their central axis fully aligns with the cylinder's; or they may be slid so that only a portion of ring's opening is within the opened area of the cylinder.

Attachment holes in the ring laminations' perimeter area allow for attachments to be applied to the laminations, (40) in FIG. 6b. Attachments may include light shields. The ring laminations are support platforms for lenses, filters, polarizers, etc. to be added or deleted from the cylinder.

The rigid rod's fixed angle bends align cylinder and ring laminations with the rigid sheet so that a line drawn through the center of the cylinder intersects the rigid sheet along its mid-longitude line, FIG. 8.

What is claimed is:

1. A hand grip for palm-held devices comprising:
   a rigid sheet having contoured and scored edges;
   a top and bottom side of said sheet, said top and bottom sides being laminated with slip-resistant, resiliently deformable materials, said top side having a longitudinal lamination of hook and loop material;
   a transverse edge of said sheet with a plurality of modular recesses;
   a centered cylindrical cut-out in the longitudinal dimension of one of said sheet's contoured edges, said longitudinal cut-out having a first opening at said sheet's transverse edge opposed to said modular recessed edge, a second opening on said top side of said longitudinally cut-out edge, said second opening being a termination of said cut-out; said opposed longitudinal edge being solid and having a third opening correspondingly positioned to said second opening, said third opening being a vertical cut-out terminating on said bottom side of said solid longitudinal edge, said vertical cut-out termination being a surface depression on said bottom of said solid longitudinal edge;
   a pliable line inserted into said sheet's cylindrical cut-out at said first opening, said line exiting said cylindrical cut-out at said second opening, said line looping above said sheet's laminated top side and reinserting into said sheet at said third opening, said line traveling through said vertical cut-out of said solid longitudinal edge and being secured to said bottom side of said solid longitudinal edge, said securing being situated in said surface depression;
   a housing for a spring tension cord stop in said sheet's cylindrical cut-out longitudinal edge, said housing being perpendicular to and intersecting said cut-out, said housing having a plurality of apertures, said apertures aligning with said cut-out, said pliable line passing through said cord stop positioned in said housing, a non-tensioned cord stop at unsecured end of said line;

a demountable bracket;

a horizontal component to said bracket being a block;

a plurality of studs defining a front edge of said bracket's block, said studs mating correspondingly by insertion into and retraction from said modular recesses of said sheet, said insertion aligning said bracket's block in the same plane as said laminated top and bottom sides of said sheet;

a vertical component of said bracket formed by a plurality of congruent parallel walls perpendicularly intersecting said block, said intersection defining a bottom side of said vertical component, opposed to said bottom is a top side, said vertical component having a front side corresponding to said front of said block and a rear side, said front side and said top side being defined by a corresponding contouring of said walls' edges, said wall's rear edges being straight, said front and top edges being further defined by a cul-de-sac cut-out centered between said contoured edges of said walls with said cul-de-sac's opening proximal to said vertical component's top, said cul-de-sac's end being proximal to said intersection of said horizontal block and said vertical components of said bracket;

opposed circular transverse cut-outs in said parallel walls flanking said cul-de-sac's opening at said vertical component's top;

opposed transverse cut-outs at said rear bottom of said vertical component, said transverse cut-outs being parallel to said flanking cut-outs at said vertical component's top;

a slideable coupling of I-beam design inserted into said cul-de-sac pathway, said coupling having an upper component and a lower component, said upper and said lower components being connected by a vertical component situated in the space between said cul-de-sac's lateral sides, said upper and said lower components respectively extend transversely above and below said cul-de-sac's top and bottom sides, said upper component having a contour corresponding to said vertical component's contoured edge, said lower component being circular, said coupling being slideable between said cul-de-sac opening and said cul-de-sac end;

a hook embedded in said coupling's lower component section extending below said lower component;

a top pin inserted into said opposed circular cut-outs flanking said cul-de-sac's opening at said vertical component's top;

a bottom pin inserted into said aligned rear bottom cut-outs parallel to said vertical component's top pin;

a pliable steel rod with looped ends housed between said vertical component's parallel walls, said steel rod linking said bottom pin and said embedded hook by means of said looped ends, said steel rod being tensioned between said bottom pin and said coupling hook, said tension conveying through said coupling to contiguous fixed angle bend rod segments attached to said coupling's upper component, said rod segments being slideable by means of said attachment;

a surface depression a cul-de-sac end of greater diameter than said coupling's upper component, said rod tension pulling on said coupling seats said coupling in span separating said walls of said vertical component, said surface depression cul-de-sac end disengaging said coupling from said cul-de-sac's opposed lateral sides.

2. A hand grip for palm held devices as set forth in claim 1, further comprising: an end-cap of generally cubic design attached to said rod segments at end opposed to said slideable coupling;

a transverse circular cut-out of uniform diameter passing through a center point of said end cap;

a lower section of said end-cap being the span below said transverse cut-out to said fixed angle rod segments;

an upper section of said end-cap, said upper section being the opposed span;

a sill formed on said lower section by reduction of said upper section in the dimension of said transverse circular cut-out, said sill being adjacent to said transverse cut-out.

3. A hand grip for palm held devices as set forth in claim 1, further comprising:

a cylinder opened on both opposed ends, said cylinder having a circular stud extension of uniform diameter from a point on its outside wall, said circular stud mating correspondingly by insertion into said end-cap's transverse circular cut-out, said insertion positioning said cylinder laterally opposite said end-cap;

an arc lamination applied to said cylinder's circular stud, said arc limiting the rotation of said cylinder;

an interior sill, said sill defining a bottom end of said cylinder;

an oblong post component of said cylinder, said post being perpendicular and adjacent to said circular stud and forming a section of said cylinder's outer wall, said post extending above said cylinder's open end in the direction opposite said interior sill, said post defining a top end of said cylinder;

a plurality of aligned cut-outs in said post above said top side of said cylinder;

a plurality of demountable, concentric ring laminations of an outside diameter congruent with said cylinder's wall and an inside opening diameter congruent with that formed by said interior sill said ring laminations being of variable thickness, each of said ring laminations having a congruent rectangular arm extending from its circumference, each of said congruent extension arms having a rectangular cut-out, each of said congruent extension arms seating on said oblong post with said rectangular cut-outs allowing movement of said extension arms corresponding to said post's longitudinal dimension;

a plurality of holes in the perimeter area of said ring laminations allow for attachments to be applied to said laminations;

a plurality of curved brackets on the circumference of each of said ring laminations, said curved brackets positioned for finger grasp and control of said congruent extension arm movement;

an L-shaped lever pin inserting into and removing from said oblong post's aligned cut-outs, said insertion of said lever pin into said aligned cut-outs applying tension between said ring laminations and said top opening of said cylinder, said lever pin allowing for addition and deletion of said laminations to said cylinder.

* * * * *